Patented Mar. 4, 1930

1,749,113

UNITED STATES PATENT OFFICE

KARL SCHMIDT, OF LEVERKUSEN, GERMANY, ASSIGNOR TO GENERAL ANILINE WORKS, INC., OF NEW YORK, N. Y., A CORPORATION OF DELAWARE

NEW DYESTUFFS OF THE TRIPHENYLMETHANE SERIES

No Drawing. Application filed October 20, 1928, Serial No. 313,934, and in Germany April 21, 1927.

The present invention relates to new acid dyestuffs of the triphenylmethane series.

I have found that by reacting upon a primary aromatic amine with such an aromatic aldehyde as contains a sulfo group in o-position to the aldehyde group according to methods usual in the manufacture of triphenylmethane dyestuffs, new dyestuffs of this series are obtainable which can be used with advantage for the direct dyeing of silk, wool and other fibres, since they exert an excellent solubility in water and dye strong violet to blue shades of good fastness properties especially to alkalies and light. The dyestuffs probably correspond in their free form to the general formula

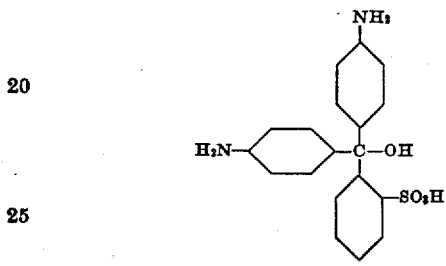

wherein the benzene nuclei may be further substituted. The form dark blue to black powders easily soluble in water (in form of their alkali metal salts) with violet to blue colorations.

The invention is illustrated by the following example without being restricted thereto:—

*Example.*—One molecule of potassium benzaldehyde-2:4-disulfonate and 2 molecules of vic. meta-xylidine hydrochloride are condensed in aqueous solution to the leuco acid at about 100° C., whereby the free leuco acid deposits. 1 part of the isolated leuco acid is then introduced, either wet or dry and if necessary with the addition of a small amount of acetic acid, into 3 parts of nitrobenzene, 0,1 part of ferric chloride are added as oxygen carrier and the leuco acid is oxidized to the dyestuff by heating to about 130° C. The dyestuff thus obtainable forms a blueish black powder easily soluble in water and probably corresponds in its free form to the formula

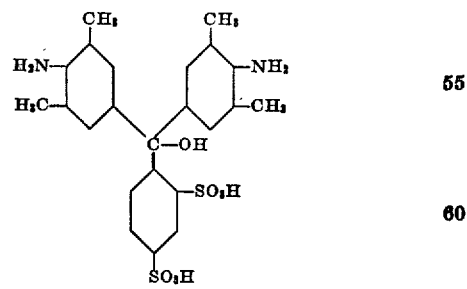

It dyes wool evenly from an acid bath a blueish violet, fast to light.

The dyestuff from ortho-toluidine and benzaldehyde-ortho-sulfonic acid dyes silk violet shades. Other benzaldehydes such as benzaldehyde-2.5-, 2.6-disulfonic acid or 5-chlorobenzaldehyde-2.4-disulfonic acid e. a. may be used with a similar effect.

I claim:—

1. Triphenylmethane dyestuffs having in their free form the probable formula

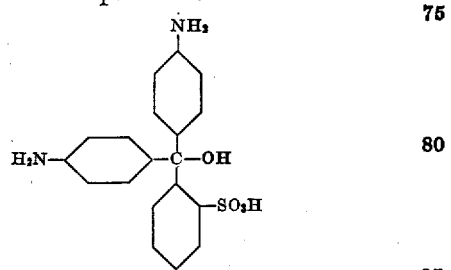

wherein the benzene nuclei may be further substituted said dyestuffs forming dark blue to black powders easily soluble in water (in form of their alkali metal salts) with violet to blue colorations, dyeing wool, silk and other fibres strong violet to blue shades of good fastness properties especially to alkalies and light.

2. The dyestuff having in its free form the probable formula

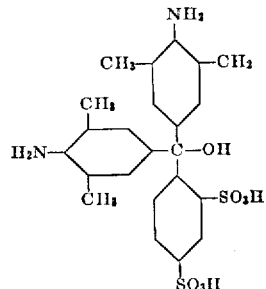

said dyestuff forming a blueish black powder, easily soluble in water, dyeing wool a blueish violet, fast to alkalies and light.

In testimony whereof I have hereunto set my hand.

KARL SCHMIDT. [L. S.]

Certificate of Correction

Patent No. 1,749,113.  Granted March 4, 1930, to

KARL SCHMIDT

It is hereby certified that error appears in the printed specification of the above numbered patent requiring correction as follows: Page 2, Claim 2, in the formula for "$CH_2$" read $CH_3$, and that the said Letters Patent should be read with this correction therein that the same may conform to the record of the case in the Patent Office.

Signed and sealed this 1st day of April, A. D. 1930.

[SEAL.]

M. J. MOORE,
*Acting Commissioner of Patents.* other fibres strong violet to blue shades of good fastness properties especially to alkalies and light.

2. The dyestuff having in its free form the probable formula

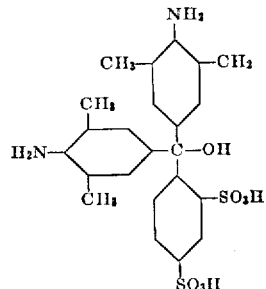

said dyestuff forming a blueish black powder, easily soluble in water, dyeing wool a blueish violet, fast to alkalies and light.

In testimony whereof I have hereunto set my hand.

KARL SCHMIDT. [L. S.]

Certificate of Correction

Patent No. 1,749,113.                                          Granted March 4, 1930, to

KARL SCHMIDT

It is hereby certified that error appears in the printed specification of the above numbered patent requiring correction as follows: Page 2, Claim 2, in the formula for "CH$_2$" read *CH$_3$*, and that the said Letters Patent should be read with this correction therein that the same may conform to the record of the case in the Patent Office.

Signed and sealed this 1st day of April, A. D. 1930.

[SEAL.]

M. J. MOORE,
*Acting Commissioner of Patents.*